United States Patent [19]

Niemeier

[11] Patent Number: 4,608,161

[45] Date of Patent: Aug. 26, 1986

[54] HEATABLE FUEL FILTER FOR DIESEL ENGINES

[75] Inventor: Gerd Niemeier, Stuttgart, Fed. Rep. of Germany

[73] Assignee: Daimler-Benz Aktiengesellschaft, Fed. Rep. of Germany

[21] Appl. No.: 727,431

[22] Filed: Apr. 26, 1985

[30] Foreign Application Priority Data

Apr. 26, 1984 [DE] Fed. Rep. of Germany ....... 3415522

[51] Int. Cl.$^4$ ...................... B01D 23/00; F02M 31/00
[52] U.S. Cl. .................................. 210/149; 210/185; 210/416.4; 210/541; 210/542
[58] Field of Search ............... 210/184, 185, 149, 181, 210/416.4, 232, 541, 542; 123/557

[56] References Cited

U.S. PATENT DOCUMENTS

| | | | |
|---|---|---|---|
| 4,406,785 | 9/1983 | Siefer | 210/184 |
| 4,539,108 | 9/1985 | Izutani et al. | 210/184 |

Primary Examiner—Frank Sever
Attorney, Agent, or Firm—Barnes & Thornburg

[57] ABSTRACT

A heatable fuel filter for a motor vehicle engine is provided wherein an electric heating element is positioned between a filter head and filter box. In order to prevent fuel contained in the filter head and fitler box from being discharged to the surroundings when the filter box is changed, the filter box is provided with an element for collecting and containing this fuel. A lid container provided for the filter box is filled by the heating element when the filter box is attached to the filter head and heating element. When the filter box is removed from the heating element and filter head, the volume previously occupied by the heating element becomes available for collecting and containing residual fuel flow from the filter head and heating element. The lid container preferably has a volume greater than the volume of fuel contained in the filter head and the heating element.

13 Claims, 1 Drawing Figure

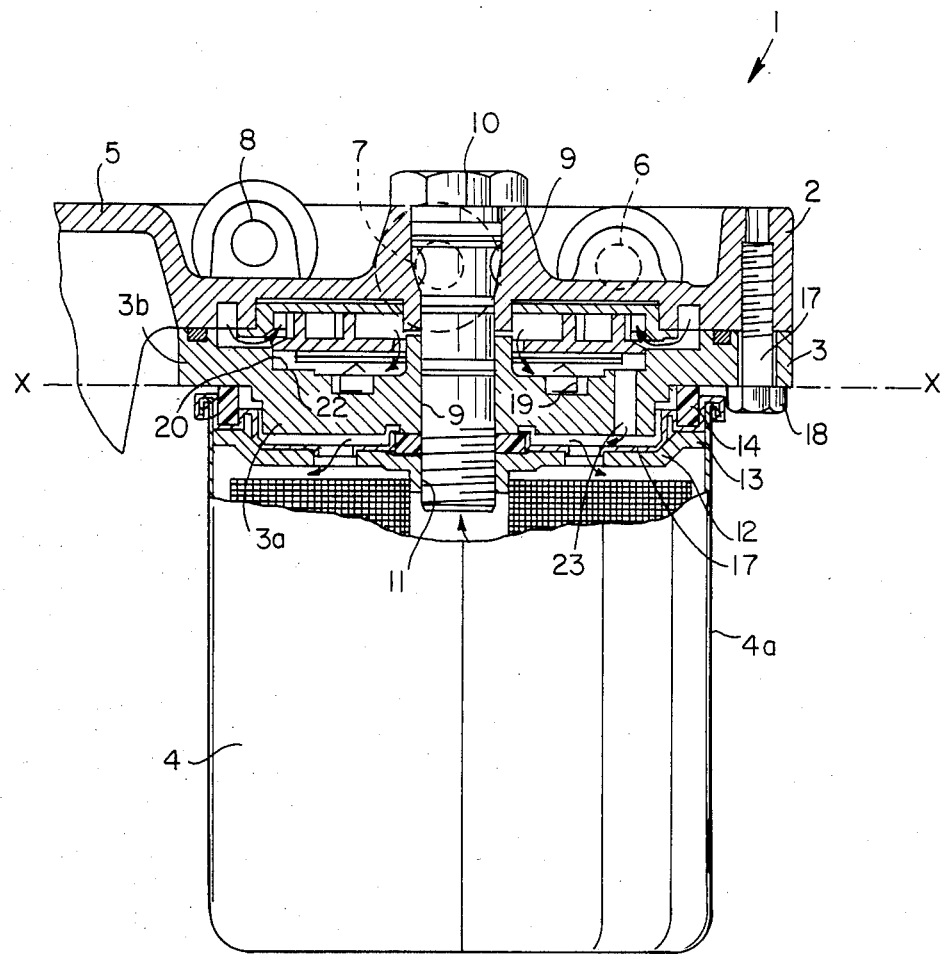

HEATABLE FUEL FILTER FOR DIESEL ENGINES

BACKGROUND AND SUMMARY OF THE INVENTION

This invention relates generally to a fuel filter for engines such as Diesel engines and more particularly to fuel filters having heating elements.

During winter operation of a vehicle, obstructions frequently occur in the vehicle engine fuel filter due to the formation of solid fuel matter caused by low temperatures. In order to avoid the danger of the occurrence of these obstructions in the fuel filter, filter designs incorporating heating units are known. One such design (see BMW Service Information, Structural Components: 13, Fuel Processing and Controlling, September 1983) discloses an electric heating element for heating fuel which is arranged between a filter head and a filter box. The heating element, which is disk-shaped and automatically controlled, is secured to a filter head along with a filter box by means of a central bolted connection. When it is necessary to change the filter box, the flow of fuel to the filter is interrupted and the filter box is detached from the threaded bolt that is firmly connected with the filter head. During this operation, the residual fuel located in the filter head and the heating element runs out and is discharged into the surrounding area in a downward direction.

One objective of the present invention is to provide a fuel filter device permitting quick and efficient change of an attached filter box.

Another object of the present invention is to provide a filter device which permits replacement of the filter box without discharge of residual fuel contained in the fuel filter into the surrounding area.

These and other objects of the present invention are achieved by the provision of a heated fuel filter for motor vehicle engines having a built-in device for preventing spillage of fuel contained in the filter element during replacement of the filter box portion of the filter. The heatable fuel filter comprises a heating element located between a filter head having an inlet and outlet duct and a filter box. The filter head, heating element and filter box are secured together at the filter head by a central bolted connection. When assembled, a portion of the heating element extends into the filter box, thereby occupying a portion of the interior of the filter box. When the filter box is removed from the filter head/heating element assembly, residual fuel contained in the filter head and heating element drains into the space in the filter box which was previously occupied by the lower portion of the heating element. Since the volume of this region (which, prior to disassembly, was occupied by the lower portion of the heating element) is designed to be greater than the volume of fuel contained the filter head and the heating element, fuel draining from the filter head and the heating element will be completely contained in this region without discharge of fuel into the surroundings. This will be true regardless of the fact that the filter box is filled to capacity while attached to the heating element after interruption of the fuel flow to the filter.

It is further contemplated that a sealing ring or gasket may be located in the upper portion of the filter box. In addition to performing a sealing function between the filter box and the heating element, this sealing ring may delimit part of the region of the filter box which receives the residual fuel draining from the filter head and heating element. A support for this sealing ring can be provided on the upper portion of the filter box. This support may comprise a holding plate formed by the cylindrical wall of the filter box along with a flat peripheral portion of the filter box adjacent the cylindrical wall.

In a further development, a central bolted connection securing the filter box to the filter head/heater element assembly comprises a fastening screw penetrating the filter head, heating element and a threaded hole in the filter box. In this manner, quick removal of the filter box becomes possible and spilling of fuel is avoided during the removal procedure.

A further advantageous development comprises flanging the heating element to the filter head by means of several fasteners. Preferably, three or more screws are employed. Such a construction precludes rotation for detaching of the heating element from the filter head when the filter box is removed. In this manner, the rotating or detaching problem of the prior art device described above is effectively overcome.

In another advantageous embodiment, fuel discharged from tne heating element is minimized by providing drainage means within the heating element which prevent fuel accumulation above a selected level.

Other objects, advantages and novel features of the present invention will become apparent from the following detailed description of the invention when considered in conjunction with the accompanying drawing.

BRIEF DESCRIPTION OF THE DRAWING

The Drawing shows a cross sectional view of a heatable fuel filter for motor vehicle engines in accordance with a preferred embodiment of the present invention.

DETAILED DESCRIPTION OF THE DRAWING

A fuel filter 1 intended for engines, such as Diesel engines, comprises a filter head 2, electric heating element 3 and filter box 4. The filter head 2 is fastened to the engine (not shown) by holding means 5. Filter head 2 is provided with inlet and outlet ducts 6, 7 and with a vent duct 8. Botn filter head 2 and heating element 3 have a centrally located bore 9 for fastening means 10 which penetrates the heating element 3 and engages a threaded hole 11 of the upper region 12 of the filter box. This upper region 12 is designed as a lid container. By means of the fastening means 10, the filter box 4 is secured to the filter head 2 via the heating element 3.

Lid 12 is boat-shaped, and a sealing ring 14 is arranged on a raised flat edge of the lid 12. The sealing ring 14 may be glued to the edge 13 or, as shown in the drawing, inserted into a holding plate 16 in the vicinity of the edge 13 of the lid. The holding plate 16 is firmly attached to the lid 13 and the cylindrical wall 15 of the filter box 4. The sealing ring 14 is enclosed in a U-shaped manner by the holding plate 16 and in this manner radially fixed.

Lower portion 3a of the disk-shaped heating element 3 acts as a displacement part and projects into the boat-shaped construction of the upper part 12 of the filter box.

The portion 3b of heating element 3 has an enlarged diameter which provides a sealing surface which rests on the sealing ring 14. The fastening of the heating element 3 to the filter head 2 takes place by three evenly distributed fasteners 17. The fastener heads 18 are positioned at the level of the separating plane "x" and are accessible from the outside. The heating element 3 contains self-controlled PTC semiconductor dots that contact and heat fuel which passes through it. The contact springs for the PTC dots have the reference number 19.

When it becomes necessary to change the filter box, the fastening means 10 designed as a hexagonal head cap screw need only be unscrewed and the filter box 4 pulled off in the downward direction. During this removal process, residual fuel flowing out of the filter head 2, and the heating element 3 is not discharged to the outside. Rather, this fuel is collected by the boat-shaped lid portion 12 during and after removal of the filter box from the lower portion 3a of heating element 3. The volume of residual fuel discharged from the heating element 3 is minimized by the fact that the heating element interior surface 21 delimiting the inside space 20 has a raised edge 22 with inlet bore 23 leading from the heating element 3 to the filter box 4. This bore prevents the fuel level within space 20 from rising above raised edge 22.

The arrows in the fuel filter indicate the path of flow of fuel which is drawn into the filter by a feed pump (not shown in the drawing) when the engine filter is in operation.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

I claim:

1. A fuel filter for a motor vehicle engine, said fuel filter having heating element means positioned between filter head means and filter box means, said filter box means including: fuel collecting means for collecting and containing residual fuel remaining in said filter head means and said heating element means when said filter head means is detached from said filter, said fuel collecting means including means for preventing residual fuel from discharging to the surrounding area when said filter head means is detached from fuel filter.

2. A fuel filter according to claim 1, wherein said fuel collecting means comprises lid container means at least partially filled by said heating element means when said filter box means is attached to said filter, said lid container means being unfilled and capable of containing fuel when said filter vox means is detached from said filter.

3. A fuel filter according to claim 2, wherein said heating element means completely fills said lid container means when said filter box means is attached to said filter.

4. A fuel filter according to claim 3, further comprising sealing ring means located between said heating element means and said filter box means.

5. A fuel filter according to claim 4, further comprising holding plate means attached to said lid container means for supporting said sealing ring.

6. A fuel filter according to claim 5, wherein said holding plate means includes a U-shaped portion for containing said sealing means.

7. A fuel filter according to claim 2 wherein said lid container means has a volume greater than a volume occupied by said residual fuel remaining in said filter head means and said heating element means.

8. A fuel filter according to claim 1, wherein said filter box means is detachably secured to said filter head means and said heating element means by fastening means.

9. A fuel filter according to claim 8, wherein said fastening means comprises fastening screw means.

10. A fuel filter according to claim 9, wherein said fastening screw means passes through said filter head means and said heating element means and engages threaded hole means in said filter box means.

11. A fuel filter according to claim 1, wherein said heating element means is attached to said filter head means by secondary fastener means.

12. A fuel filter according to claim 11, wherein said secondary fastener means comprises at least three screw means.

13. A fuel filter according to claim 1, wherein said heating element has a cavity for passage of fuel through said element, said cavity having a bottom surface, said bottom surface having a raised portion, said raised portion having an inlet bore connecting said heating element means with said filter box means.

* * * * *

UNITED STATES PATENT AND TRADEMARK OFFICE
CERTIFICATE OF CORRECTION

PATENT NO. : 4,608,161

DATED : Aug. 26, 1986

INVENTOR(S) : Gerd Niemeier, Stuttgart, Fed. Rep. of Germany

It is certified that error appears in the above-identified patent and that said Letters Patent is hereby corrected as shown below:

Column 1, Line 55: after "contained", please insert --in--.

Column 2, Line 43: change "Botn" to "Both".

Signed and Sealed this

Twenty-first Day of April, 1987

Attest:

DONALD J. QUIGG

Attesting Officer     Commissioner of Patents and Trademarks